United States Patent Office 2,832,805
Patented Apr. 29, 1958

2,832,805

2-ARYLMETHYLENE - 4a - METHYL-6 - HYDROXY-1,2,3,4,4a,9,10,10a - OCTAHYDRO - 1 - PHENANTHRONES AND DERIVATIVES THEREOF

Willard M. Hoehn, Wilmette, and Roy H. Bible, Jr., Morton Grove, Ill., assignors to G. D. Searle & Co., Chicago, Ill., a corporation of Delaware No Drawing. Application January 24, 1957
Serial No. 635,931

7 Claims. (Cl. 260—586)

The present invention relates to 2-arylmethylene-4a-methyl - 6 -hydroxy - 1,2,3,4,4a,9,10,10 - octahydro - 1 - phenanthrones and derivatives thereof. The compounds which constitute our invention can be represented by the general structural formula

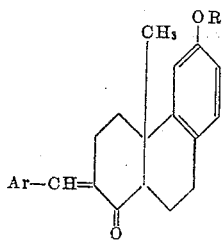

In this formula, R can represent hydrogen or a hydrocarbon radical containing fewer than nine carbon atoms, and Ar can represent an aromatic hydrocarbon or halohydrocarbon radical containing fewer than 11 carbon atoms. When R is a hydrocarbon radical it can represent a lower alkyl radical such as methyl, ethyl, propyl, butyl, amyl, hexyl, heptyl, octyl, or a branched-chain isomer of one of the foregoing. It can also represent an aralkyl hydrocarbon radical such as benzyl, methylbenzyl, dimethylbenzyl, or ethylbenzyl. The term Ar can represent the phenyl radical, an alkylated phenyl radical, a naphthyl radical, or a monohalogen or polyhalogen substitution product of one of the foregoing.

This is a continuation-in-part of our copending application, Serial No. 338,151, filed February 20, 1953, now abandoned.

Suitable starting materials for the manufacture of the compositions of the present invention are alkyl and aralkyl ethers of 4a - methyl - 6 - hydroxy - 1,2,3,4,4a,9,10,10a - octahydro - 1 - phenanthrone described in U. S. 2,764,616. Another suitable starting material is 4a-methyl - 6 - hydroxy - 1,2,3,4,4a,9,10,10a - octahydro - 1 - phenanthrone, the phenol corresponding to the foregoing alkyl and aralkyl ethers, which is prepared by heating 4a-methyl - 6 - methoxy - 1,2,3,4,4a,9,10,10a - octahydro-1-phenanthrone with pyridine hydrochloride. Such starting materials have the structural formula

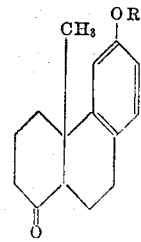

wherein R is defined as before.

In accordance with the methods described more fully in the examples to follow, such compounds are treated, suitably in alcoholic or aqueous alcoholic solution in the presence of a basic condensing agent such as an alkali metal hydroxide or an alkali metal alkoxide, with an aromatic aldehyde of the formula

Ar—CHO wherein Ar is an aromatic hydrocarbon radical having fewer than 11 carbon atoms, or a halogenated derivative thereof. This reaction can be carried out at or below room temperature for a period of several days. It can also be carried out by briefly heating the mixture to about 90–100° C., followed by allowing it to stand at room temperature for a period of up to several days. The reaction product can thereupon be isolated by direct filtration in those instances where it is insoluble. In those instances where it is phenolic and relatively soluble, it can be isolated by partitioning the acidified mixture between ether and water; non-phenolic, relatively soluble reaction products can be isolated by partitioning the mixture between ether and water without prior acidification. The recovery of the reaction product from the ethereal solution is completed by washing with a base such as dilute sodium bicarbonate, and vaporizing the solvents. Many of the compositions of this invention are high-boiling, viscous oils or glasses which can be conveniently purified by distillation in a short-path distillation apparatus.

The compositions of this invention are useful in the prevention of actinic dermatitis. For example, upon topical application, suitably in corn oil solution, they inhibit the development of sunburn and other erythemal effects caused by excessive exposure to ultraviolet radiation. They are also valuable medicinal and especially hormonal agents useful in the correction of metabolic dysfunction. One of the means which can be employed for demonstrating their effect on tissue metabolism is the Warburg respirometer. A particular pharmacological utility of the compounds of this invention is their effectiveness as antidiuretic agents.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.), distillation pressures in millimeters (mm.) of mercury, and quantities of materials in parts by weight.

EXAMPLE 1

*Ethers of 4a-methyl-6-hydroxy-1,2,3,4,4a,9,10,10a-octahydro-1-phenanthrone*

An intimate mixture of 115 parts of 1,4a-dimethyl-1-hydroxymethyl - 6 - methoxy-1,2,3,4,4a,9,10,10a - octahydrophenanthrene (O-methylpodocarpinol) and 28.5 parts of boric acid is heated in a reaction vessel for 4 hours at about 150–160° C., with occasional agitation during the first hour. While the mixture is maintained at this temperature, it is subjected to a vacuum in order to remove remaining traces of water as a distillate. The mixture is then distilled at a pressure of about 0.1–0.5 mm. in order to decompose the boric acid ester initially formed. The distillation is continued until only a dry white solid remains in the distillation vessel. The distillate collected in this manner is redistilled at about 0.1–0.5 mm. in order to yield the dehydrated O-methylpodocarpinol which is then converted to 4a-methyl-6-methoxy-1,2,3,4,4a,9,10,10a-octahydro-1-phenanthrone by ozonization according to the methods described in U. S. 2,764,616. Analogous alkoxy and aralkoxy ethers are obtained by the substitution of equivalent amounts of the corresponding ethers of podocarpinol in the foregoing procedure.

EXAMPLE 2

2-benzylidene-4a-methyl-6-methoxy-1,2,3,4,4a,9,10,10a-octahydro-1-phenanthrone A solution of 27 parts of 4a-methyl-6-methoxy-1,2,3,-4,4a,9,10,10a-octahydro-1-phenanthrone and 15 parts of freshly distilled benzaldehyde in 160 parts of absolute ethanol is mixed with a solution of 5 parts of sodium in 79 parts of absolute ethanol at 15° C. After standing for 7 days at room temperature in a closed vessel the reddish-brown reaction mixture is diluted with ether and then poured into a large volume of water. The organic layer is separated and the aqueous layer is extracted with ether. The combined organic solutions are washed with 10% aqueous sodium hydroxide and then with water to neutrality. After drying over anhydrous calcium sulfate and filtering, the solvents are stripped from the filtrate under vacuum. A dark red residue remains which is distilled in a short-path distillation apparatus. The 2-benzylidene-4a-methyl-6-methoxy-1,2,3,4,4a,9,10,10a- octahydro-1-phenanthrone is collected at about 190–200° C. and 0.08 mm. pressure. The ultraviolet absorption spectrum shows a maximum at about 290 millimicrons with a molecular extinction coefficient of 18,600. The infrared absorption spectrum shows strong and distinct absorption bands at about 5.98, 6.24, 6.70, 6.93, 7.27, 7.75, 8.05 and 9.57 microns. The compound has the structural formula

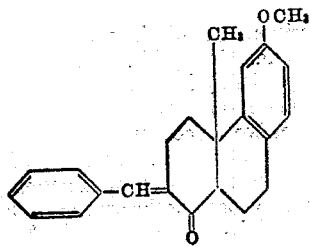

EXAMPLE 3

2,4-dinitrophenylhydrazone of 2-benzylidene-4a-methyl-6-methoxy-1,2,3,4,4a,9,10,10a-octahydro-1-phenanthrone A solution of 5 parts of 2-benzylidene-4a-methyl-6-methoxy-1,2,3,4,4a-9,10,10a-octahydro-1-phenanthrone in 20 parts of ethanol is treated with a solution of 4 parts of 2,4-dinitrophenylhydrazine, 30 parts of concentrated sulfuric acid, 30 parts of water and 80 parts of ethanol. The precipitate is collected on a filter and recrystallized three times from aqueous ethanol to yield the orange 2,4-dinitrophenylhydrazone of 2-benzylidene-4a-methyl-6-methoxy-1,2,3,4,4a,9,10,10a-octahydro - 1 - phenanthrone melting at about 113–123° C.

EXAMPLE 4

2-(p-methylbenzylidene)-4a-methyl-6-hydroxy-1,2,-3,4,4a,9,10,10a-octahydro-1-phenanthrone An intimate mixture of 2.3 parts of 4a-methyl-6-methoxy-1,2,3,4,4a,9,10,10a-octahydro-1-phenanthrone and 25 parts of pyridine hydrochloride is heated in a distillation flask until sufficient distillate has been removed to cause the distillation temperature to rise to about 210–215° C. The remaining mixture is then heated under reflux for 20 minutes, following which it is poured, with stirring, into 300 parts of hot water. The mixture is allowed to cool for complete separation of product. The solid product is then collected on a filter and air dried for use in the following operation. This compound is 4a-methyl-6-hydroxyl-1,2,3,4,4a,9,10,10a-octahydro - 1 - phenanthrone. It exhibits infrared absorption maxima at about 3.08, 5.92, 6.19, 6.33 and 6.68 microns.

A cooled solution of 25.5 parts of this product and 17 parts of p-tolualdehyde in 175 parts of absolute ethanol is mixed with a cooled solution of 5 parts of sodium in 80 parts of absolute methanol. After storage under anhydrous conditions for 3 days the mixture is diluted with ether and then poured into a large volume of water containing sufficient acid to neutralize the alkali present. The organic layer is separated and the aqueous layer is exhaustively extracted with ether. The combined organic layers are washed with dilute sodium bicarbonate and then with water to neutrality, dried over anhydrous calcium sulfate, filtered and evaporated. The dark reddish residue is distilled under a pressure of about 0.05 mm. The 2-(p-methylbenzylidene)-4a-methyl-6-hydroxy-1,2,3,4,4a,9,10,19a-octahydro-1-phenanthrone shows an ultraviolet absorption maximum at about 293 millimicrons with a molecular extinction coefficient of 18,700. Well defined infrared maxima are observed at about 6.0, 6.26, 6.72, 6.90, and 7.24 microns. The compound has the structural formula

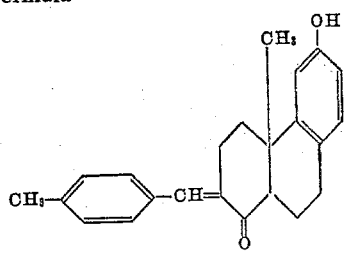

EXAMPLE 5

2-(o,p-dimethylbenzylidene)-4a-methyl-6-hydroxy-1,2,3,4,4a,9,10,10a-octahydro-1-phenanthrone A cooled solution of 51 parts of 4a-methyl-6-hydroxy-1,2,3,4,4a,9,10,10a-octahydro - 1 - phenanthrone and 38 parts of o,p-dimethylbenzaldehyde in 500 parts of anhydrous propanol is mixed with a cooled solution of 10 parts of sodium in 160 parts of absolute ethanol and permitted to stand at room temperature under anhydrous conditions for 5 days. The reaction mixture is then diluted with ether and poured into a large volume of water containing sufficient acid to neutralize the alkali present. The organic layer is separated. The inorganic layer is extracted with ether and the combined organic solutions are washed with dilute sodium bicarbonate and then with water to neutrality. After drying over anhydrous sodium sulfate and filtration, the filtrate is concentrated in vacuo. The residual oil is distilled at about 0.05–0.07 mm. pressure to yield the 2-(o,p-dimethylbenzylidene)-4a-methyl-6-hydroxy - 1,2,3,4,4a,9,10,10a-octahydro-1-phenanthrone which shows infrared maxima at about 2.99, 5.99, 6.24, 6.69, 6.89, and 7.25 microns. The compound has the structural formula

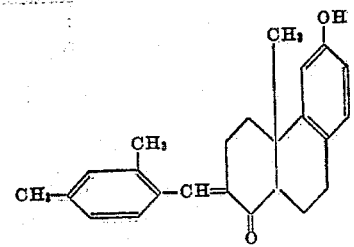

EXAMPLE 6

2 - (α - naphthylmethylene) - 4a - methyl - 6 - methoxy-1,2,3,4,4a,9,10,10a-octahydro-1-phenanthrone A chilled solution of 54 parts of 4a-methyl-6-methoxy-1,2,3,4,4a,9,10,10a - octahydro - 1 - phenanthrone and 45 parts of α-naphthaldehyde in 500 parts of absolute ethanol is treated with a chilled solution of 10 parts of sodium and 160 parts of absolute ethanol and stored under anhydrous conditions for 10 days. The reaction mixture is diluted with ether and poured into a large quantity of water. The organic layer is separated and the aqueous layer is exhaustively extracted with ether. The combined organic solutions are washed with dilute sodium hydroxide and then with water to neutrality. After drying over anhydrous calcium sulfate and filtration the solvents are removed under vacuum to yield 2 - (α-naphthylmethylene)-4a - methyl - 6 - methoxy - 1,2,3,4,4a,9,10,10a-octahydro-1-phenanthrone which shows prominent infrared maxima at about 6.01, 6.88, 7.23, 8.00, and 9.60 microns. The compound has the structural formula

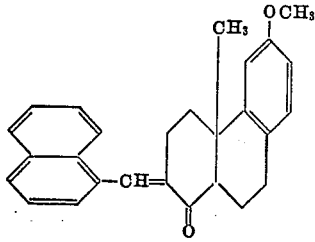

EXAMPLE 7

2 - (o-fluorobenzylidene) - 4a - methyl - 6 - hydroxy-1,2,-3,4,4a,9,10,10a-octahydro-1-phenanthrone A cooled solution of 51 parts of 4a-methyl-6-hydroxy-1,2,3,4,4a,9,10,10a - octahydro - 1 - phenanthrone and 59 parts of o-fluorobenzaldehyde in 350 parts of absolute ethanol is mixed with a cold solution of 10 parts of sodium in 160 parts of absolute ethanol. The reaction mixture is maintained at room temperature in a closed vessel for five days, diluted with ether and then poured into a large quantity of water containing sufficient acid to neutralize the alkali present. The organic layer is separated and the aqueous layer is extracted with ether. The combined organic solutions are washed with 5% aqueous sodium bicarbonate and then with water to neutrality. The washed solution is then dried over anhydrous calcium sulfate, filtered and freed from solvent by vacuum distillation to yield the 2 - (o - fluorobenzylidene) - 4a - methyl - 6-hydroxy - 1,2,3,4,4a,9,10,10a-octahydro - 1 - phenanthrone which is distilled at about 0.06–0.08 mm. pressure. The infrared absorption spectrum shows maxima at 3.0, 6.01, 6.24, 6.69, 6.91, and 7.26 microns. The compound has the structural formula

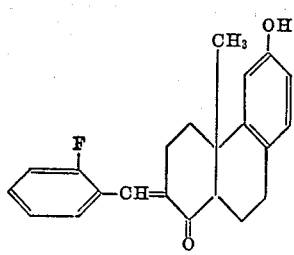

EXAMPLE 8

2 - (p - iodobenzylidene) - 4a - methyl - 6 - ethoxy - 1,2,-3,4,4a,9,10,10a-octahydro-1-phenanthrone Under cooling and anhydrous conditions a solution of 58 parts of 4a-methyl-6-ethoxy-1,2,3,4,4a,9,10,10a-octahydro-1-phenanthrone and 66.5 parts of p-iodobenzaldehyde in 500 parts of absolute ethanol is mixed with a solution of 10 parts of sodium in 160 parts of absolute ethanol. After storing under anhydrous conditions for 10 days the reaction mixture is diluted with ether and poured into water. The organic layer is separated and the aqueous layer is extracted with ether. The combined organic layers are washed with dilute ammonium hydroxide and then with water to neutrality, dried over anhydrous calcium sulfate, filtered and evaporated in vacuo. The residual 2 - (p - iodobenzylidene) - 4a - methyl - 6 - ethoxy-1,2,3,4,4a,9,10,10a - octahydro - 1 - phenanthrone shows infrared maxima at about 6.02, 6.90, 7.25, 8.00, and 9.60 microns. It has the structural formula

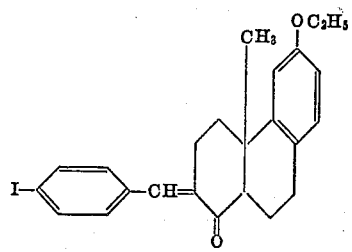

By the foregoing procedure, with the substitution of 53 parts of p-bromobenzaldehyde for the p-iodobenzaldehyde, the compound obtained is 2-(p-bromobenzylidene)-4a - methyl - 6 - ethoxy - 1,2,3,4,4a,9,10,10a-octahydro-1-phenanthrone.

EXAMPLE 9

2 - benzylidene - 4a - methyl - 6 - benzyloxy - 1,2,3,4,4a,-9,10,10a-octahydro-1-phenanthrone A solution of 500 parts of 4a-methyl-6-benzyloxy-1,2,-3,4,4a,9,10,10a-octahydro-1-phenanthrone and 222 parts of freshly distilled benzaldehyde in 2500 parts of absolute ethanol is mixed with a solution of 74 parts of sodium in 1200 parts of absolute ethanol at 18° C. After standing at that temperature under anhydrous conditions for 8 days, the reaction mixture is diluted with ether and poured into a large volume of water. The organic layer is separated and the aqueous layer is extracted with ether. The combined organic solutions are washed with 10% aqueous sodium hydroxide and then with water to neutrality, dried over anhydrous sodium sulfate, filtered and freed from solvent by vacuum distillation. The residual viscous product shows infrared absorption maxima at about 6.00, 6.26, 6.38, 6.70, and 6.87 microns. The 2-benzylidene-4a - methyl - 6 - benzyloxy-1,2,3,4,4a,9,10,10a-octahydro-1-phenanthrone has the structural formula

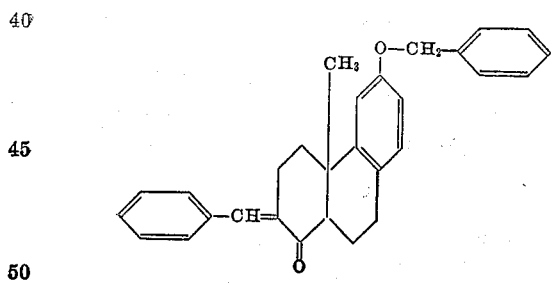

EXAMPLE 10

2 - (3,4 - dichlorobenzylidene) - 4a - methyl - 6 - methoxy-1,2,3,4,4a,9,10,10a-octahydro-1-phenanthrone A solution of 20 parts of 4a-methyl-6-methoxy-1,2,3,4,4a,9,10,10a-octahydro-1-phenanthrone and 20 parts of 3,4-dichlorobenzaldehyde in 200 parts of methanolic potassium hydroxide containing about 5% potassium hydroxide is heated for about one minute at 90–100° C. The mixture is then allowed to stand for 3 days at about 25° C. The insoluble, glassy product is washed with several portions of water by decantation. This crude product is subjected to a preliminary purification by reprecipitating it, such as by cooling a saturated solution in hot, aqueous methanol. For further purification, it is distilled in a short-path distillation apparatus. At a pressure of about 0.08 mm., a distillate of the desired product is obtained over a distillation range beginning at about 220° C. Upon cooling, the distillate forms a yellow, glassy material. This compound is 2-(3,4-dichlorobenzylidene) - 4a - methyl - 6 - methoxy - 1,2,3,4,4a,9,10,10a-octahydro-1-phenanthrone. It has an ultraviolet absorption maximum at 287 millimicrons with a molecular extinction coefficient of about 18,400. The specific rotation determined in ethanol solution, is about +69.5°. The structural formula is

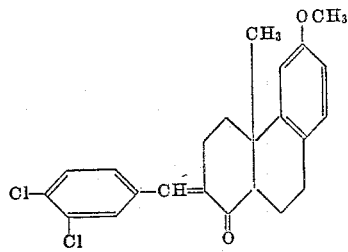

By the foregoing procedure with the substitution of 22 parts of 2-chloro-1-naphthaldehyde for the 3,4-dichlorobenzaldehyde, the compound obtained is 2-(2-chloro-1-naphthylmethylene) - 4a - methyl - 6 - methoxy - 1,2,3,4, 4a,9,10,10a-octahydro-1-phenanthrone.

What is claimed is:
1. A compound of the structural formula

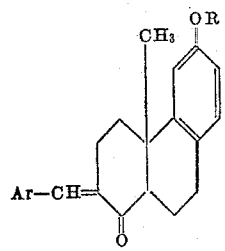

wherein R is a member of the class consisting of hydrogen and hydrocarbon radicals having fewer than nine carbon atoms, and Ar is a member of the class consisting of aromatic hydrocarbon radicals and aromatic halohydrocarbon radicals having fewer than eleven carbon atoms.

2. A compound of the structural formula

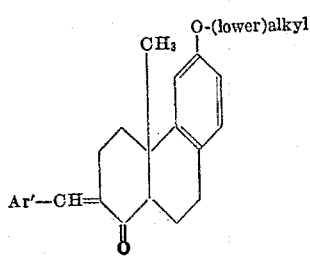

wherein Ar' is an aromatic hydrocarbon radical having fewer than eleven carbon atoms.

3. 2 - benzylidene - 4a - methyl - 6 - (lower)alkoxy-1,2,3,4,4a,9,10,10a-octahydro-1-phenanthrone.

4. 2 - benzylidene - 4a - methyl - 6 - methoxy - 1,2,3, 4,4a,9,10,10a-octahydro-1-phenanthrone.

5. A compound of the structural formula

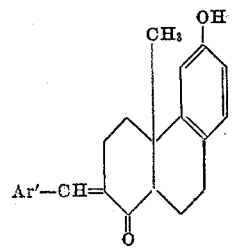

wherein Ar' is an aromatic hydrocarbon radical having fewer than eleven carbon atoms.

6. A compound of the structural formula

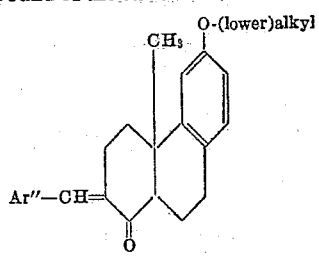

wherein Ar" is an aromatic halohydrocarbon radical having fewer than eleven carbon atoms.

7. A compound of the structural formula

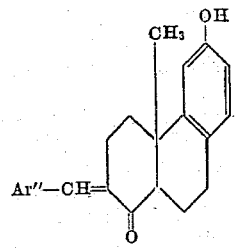

wherein Ar" is an aromatic halohydrocarbon radical having fewer than eleven carbon atoms.

No references cited.